United States Patent [19]

Schultz

[11] Patent Number: 5,293,813

[45] Date of Patent: Mar. 15, 1994

[54] COOKING POT WITH IMPROVED LOCKING STRUCTURE

[76] Inventor: Horst Schultz, Am Dornbusch 23, D-6203 Hochheim 2, Fed. Rep. of Germany

[21] Appl. No.: 952,517

[22] PCT Filed: May 24, 1991

[86] PCT No.: PCT/EP91/00965

§ 371 Date: Nov. 25, 1992

§ 102(e) Date: Nov. 25, 1992

[87] PCT Pub. No.: WO91/18543

PCT Pub. Date: Dec. 12, 1991

[30] Foreign Application Priority Data

May 26, 1990 [DE] Fed. Rep. of Germany ....... 4017067

[51] Int. Cl.⁵ .................. A47J 27/08; A47J 27/09; B65D 45/00; B65D 45/34
[52] U.S. Cl. ........................ 99/337; 99/403; 220/316; 220/325; 292/256.65
[58] Field of Search ............... 99/330, 337, 342, 338, 99/403, 410, 340, 449; 220/316, 325, 912; 126/377; 292/256, 256.6, 256.65

[56] References Cited

U.S. PATENT DOCUMENTS

| | | | |
|---|---|---|---|
| 1,208,041 | 12/1916 | Steere | 220/316 |
| 1,439,000 | 12/1922 | Jacobs | |
| 1,784,480 | 12/1930 | Beyer | 220/325 |
| 1,907,528 | 5/1933 | Evans | |
| 2,152,634 | 4/1939 | Cornell | 292/256.65 |
| 2,162,663 | 6/1939 | Lockhart | 292/256.65 |
| 2,778,736 | 1/1957 | Wagner | 99/403 |
| 2,906,191 | 9/1959 | Lee, Sr. | 99/342 |
| 4,294,377 | 10/1981 | Chen | 292/256.65 |
| 4,299,331 | 11/1981 | Bertola | |
| 4,313,371 | 2/1982 | Jackson et al. | 99/403 |
| 4,330,069 | 5/1982 | Bauer | |
| 4,470,515 | 9/1984 | Boehm | |
| 4,711,366 | 12/1987 | Chen | 99/337 |
| 4,733,795 | 3/1988 | Boehm | 220/316 |
| 4,932,550 | 6/1990 | Moucha | 99/403 |

FOREIGN PATENT DOCUMENTS

| | | |
|---|---|---|
| 0032406 | 1/1981 | European Pat. Off. . |
| 2845800 | 4/1980 | Fed. Rep. of Germany . |
| 3232907 | 3/1984 | Fed. Rep. of Germany . |
| 8419665 | 10/1984 | Fed. Rep. of Germany . |
| 3513338 | 10/1986 | Fed. Rep. of Germany ........ 99/403 |
| 9007031 | 9/1990 | Fed. Rep. of Germany . |
| 821998 | 12/1937 | France . |
| 1051706 | 1/1954 | France ................. 220/325 |
| 1052130 | 1/1954 | France . |
| 67030 | 11/1957 | France . |
| 2451733 | 3/1980 | France . |
| 437854 | 11/1935 | United Kingdom ........... 292/256.65 |
| 1600031 | 10/1981 | United Kingdom ............... 220/316 |

*Primary Examiner*—Timothy F. Simone
*Attorney, Agent, or Firm*—Wenderoth, Lind & Ponack

[57] ABSTRACT

A cooling vessel has a container with an outwardly bent rim and a lid which can be set on the container, as well as a closure device with at least one closure element arranged on the lid, preferably in the region of a rim of the lid. The closure element can swivel about a swivelling axis approximately parallel to an outer edge or to tangent to the outer edge of a rim of the container from an open position which releases the lid from the container into a locking position in which the closure element grips under the container rim, thus forming a pressure-tight seal between the lid and the container. The closure element is designed as a hollow body with an essentially cylindrical or prismatic wall essentially parallel to the direction of the swivelling axis. The wall extends over only a part of the periphery of the hollow body and has a locking wall section which can be pivoted from an open position into a closing position. The closure element rests on a shaped body.

52 Claims, 9 Drawing Sheets

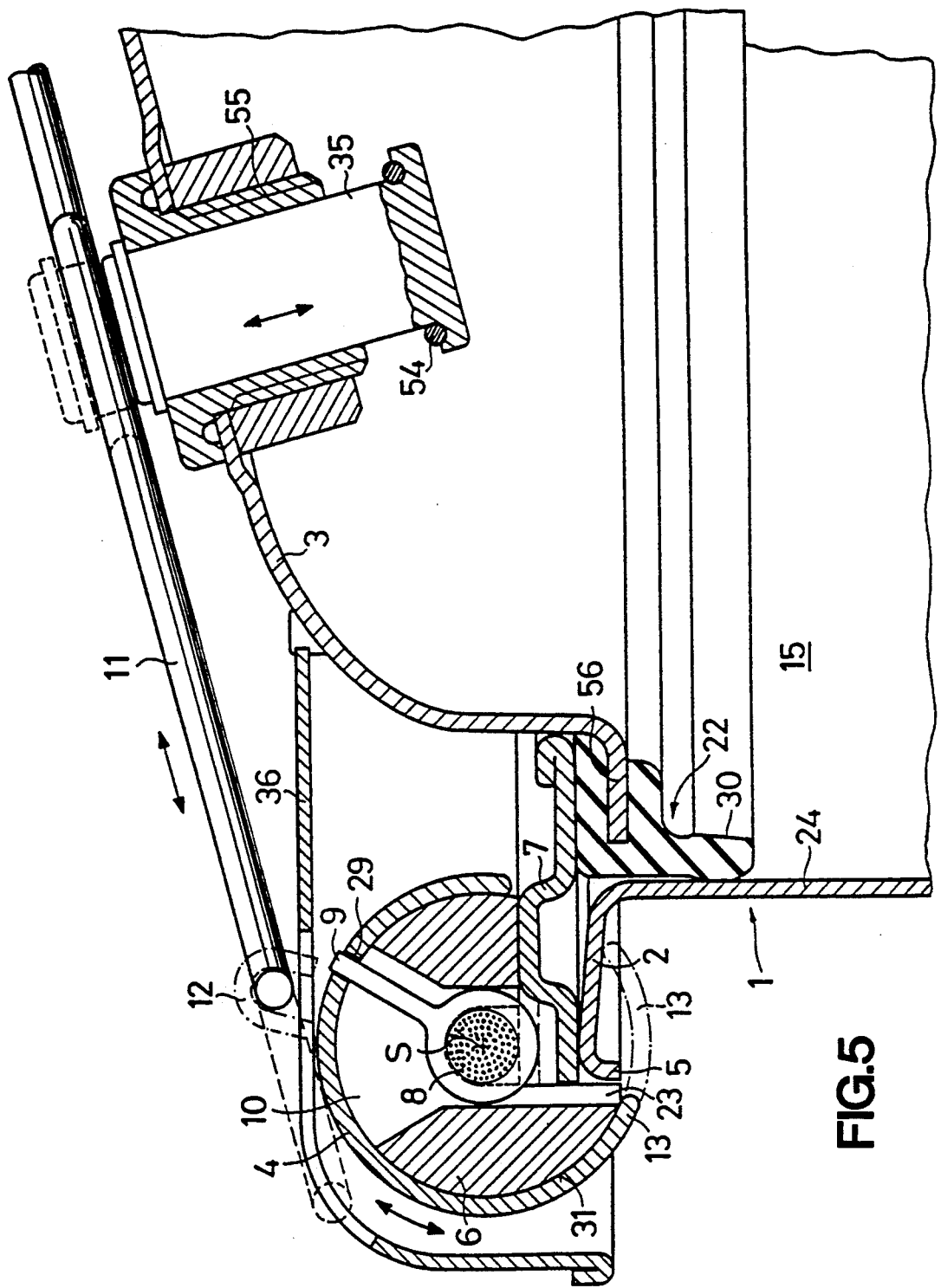

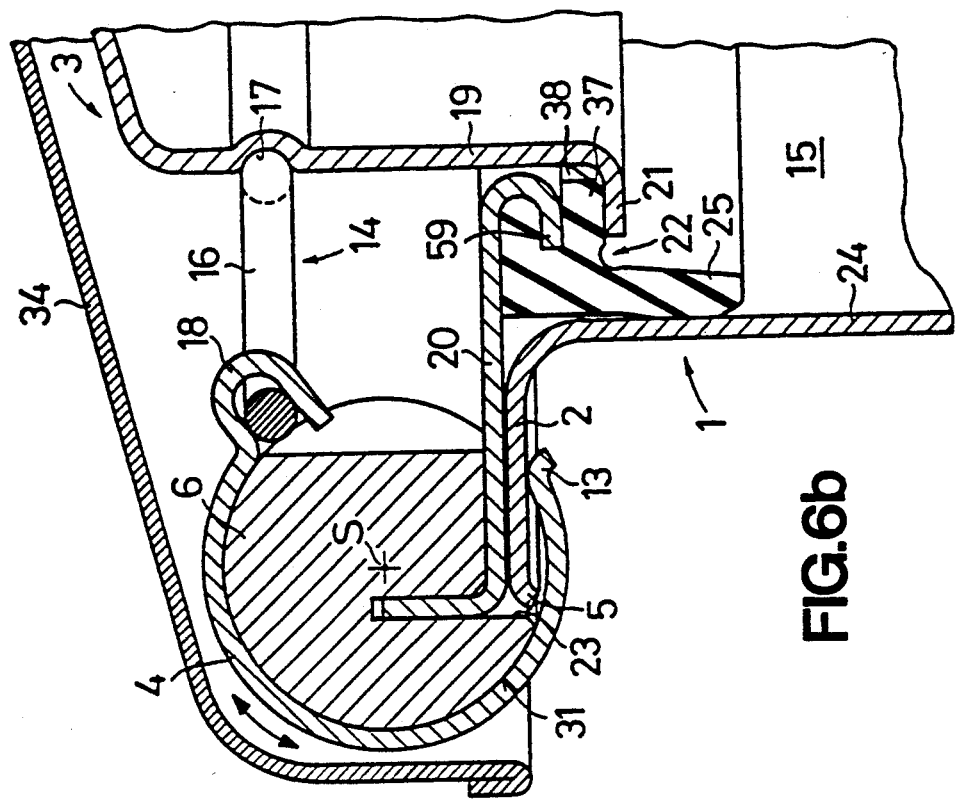
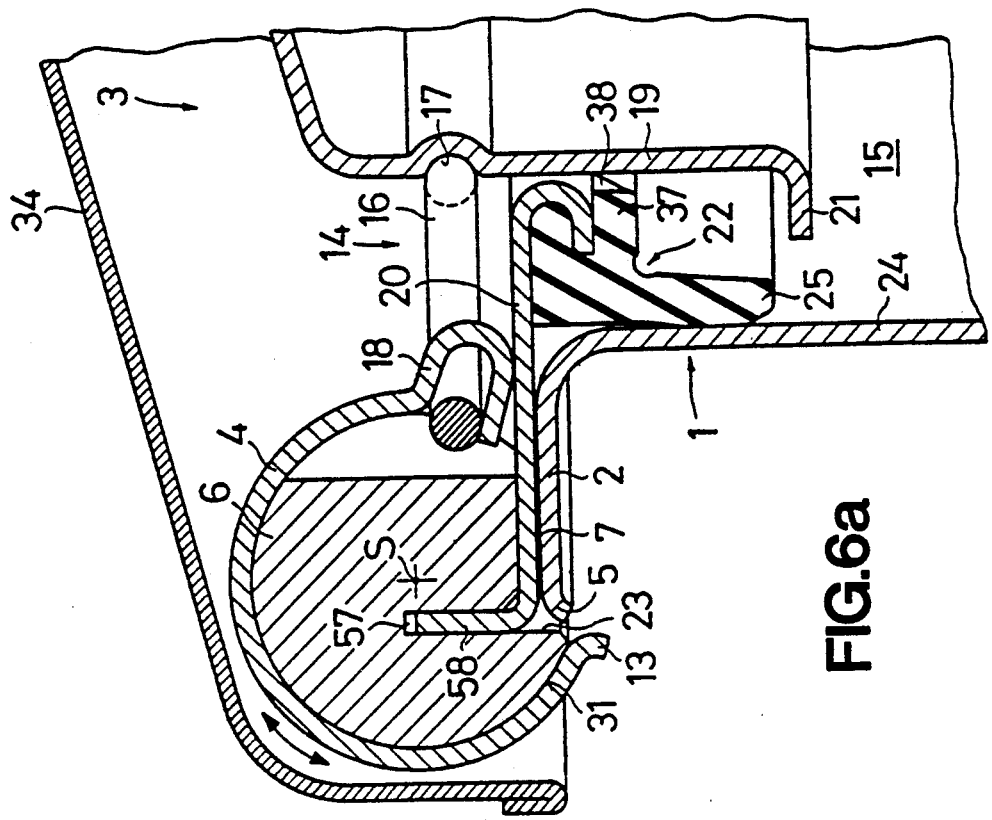

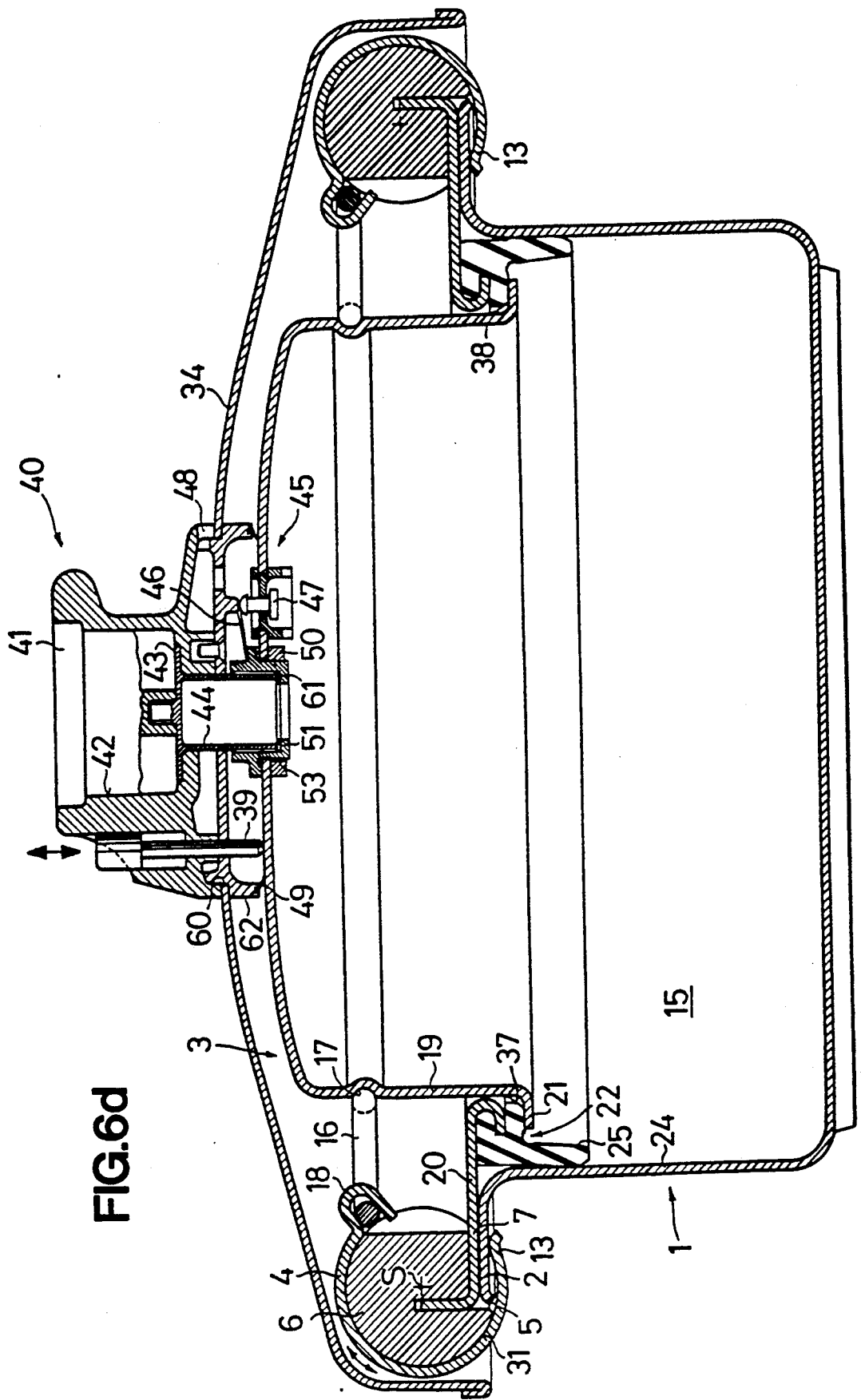

COOKING POT WITH IMPROVED LOCKING STRUCTURE

BACKGROUND OF THE INVENTION

The invention relates to a cooking pot including a container with an outwardly bent, peripheral container rim, a lid that can be set on the container and a closing mechanism with at least one closing element which is mounted on the lid, preferably in the region of a rim thereof. The closing element can be pivoted from an open position releasing the lid relative to the container, around a swivel axis extending somewhat parallel to an outer edge of the container rim or to a tangent of the container rim, into a locking position whereat the closing element reaches under the container rim to lock the lid pressure tight with respect to the container.

A cooking pot of this type is known, wherein hook-shaped closing elements, which can be pivoted at the lid individually around an axis, have hook-shaped segments extending under the container rim when the lid is set on the container. In this manner, a reliable seal of the cooking pot cannot be obtained however. In addition, the individual closing elements have to be folded over the container rim by tedious operations. There is no safety feature to prevent opening the container while the container is still under pressure.

A cooking pot disclosed in DE-OS 32 32 907 includes a container for the product to be cooked with a peripheral rim and a lid which is divided and comprises essentially a circular hood and a frame which is concentric to the hood and reaches overlappingly under the hood. In the region of the frame are disposed several U-shaped claims which are distributed uniformly over its circumference and which envelop the frame and container rim in the closed position. Between the frame and the container rim is arranged a sealing profile. The hood and the frame are tensioned with respect to each other by way of springs distributed over the circumference of the lid, and the springs simultaneously act axially on the clamps. To open this steam pressure cooker, pressure must be applied first from the top on the handle of the lid. Subsequently, the hood can be pushed downwardly relative to the frame against the force of the springs. At the same time bottom legs of the U-shaped clamps are released from the rim of the container. By means of additional pressure on the handle and thus on the hood, blocking elements issue from boreholes in the frame. Then, the hood can be twisted relative to the frame. In so doing, the clamps move essentially outwardly in the radial direction and their bottom legs free themselves from the rim of the container, so that the lid can be removed. The closing mechanism thus includes quite complicated elements that require time-consuming fabrication. Since the clamps are displaced parallel to the lid surface, they can mate only on the outer rim of the downwardly bent pot rim. At the same time, the result is a large effective lever arm for the attack of the internal pressure of the pot. For this reason, a pot having a wide rim must be designed to be suitably stable. In the known steam pressure cooker, the designed sliding of the clamps under spring pressure results in relatively high closing forces which in practice render the opening and closing operations more difficult. The closing and opening operations furthermore are inconvenient since one must push and rotate at the same time. Finally, the seal must have a high coefficient of friction in order to hold the frame in position relative to the pot. If oil or another lubricant get between seal and pot rim, the pot rim cannot be closed or opened.

SUMMARY OF THE INVENTION

The object of the invention is to provide a cooking pot of the aforementioned type, but which can be closed and opened conveniently, reliably and with negligible force, which includes a simple closing mechanism and which therefore can be manufactured cost-effectively.

This object is achieved essentially according to the invention by providing the closing element as a hollow body with a substantially cylindrical or prismatic wall that extends substantially parallel to the direction of the swivel axis and which extends over only one segment of its circumference and that can be swivelled with one section of the locking wall from an open position into a locking position, and by mounting the closing element on a shaped body.

By means of the special design of the closing element and its pivotable mounting, preferably with the swivel axis in the immediate vicinity of the outer edge of the pot rim, the closing element can be swivelled around the pot rim and thus reach inwardly far under the container rim, close to the wall of the container, even when the container rim is bent outwardly toward the bottom. Since no spring forces and no internal pot pressure, and consequently also only small forces of friction, act on the closing element, the opening and closing operations can be conducted by an operator conveniently and with negligible force, especially when the shaped body is made of a material with a low coefficient of friction, such as plastic. The closure principle of the invention can be applied both to round and oval and to polygonal cooking pots, in particular square or rectangular cooking pots, where different pot shapes can always be fitted with the same closing elements and shaped bodies, merely in adaptation to different outer contours in different arrangements. The entire closing mechanism with the closing elements can be mounted as one unit on the lid and does not interfer with handling of the container, for example, when filling or pouring the cooking product. Furthermore, with the arrangement of the closing elements in the region of the lid rim, the purpose is achieved that, with a suitable arrangement of the swivel axis, by swivel movement of corresponding angular degrees the closing elements can be moved to extend far under the rim of the pot with few operating mechanisms. The precise region of contact of the pivotable closing elements with the rim of the pot can be defined through the selection of the position of the swivel axis. Furthermore, the shape of the closing elements also ensures that they can withstand relatively high pressures. By positioning the closing elements on a shaped body adapted to the inner contour of the closing elements a reliable swivel movement for opening and closing the cooking pot can be achieved.

An especially space-saving construction is obtained when the shaped body is disposed on the lid rim and accommodates in a sectored or segmented recess the container rim and the lid rim. If a part of the surface of the shaped body serving as a bearing surface is designed circular-cylindrically in adaptation to inner edges of the closing element, negligible operating forces are necessary to operate the closing element, in order to open or close the cooking pot.

In a further development of the inventive idea, the bearing surface of the shaped body includes at least one flattening or indentation, which in the locking position of the closing element interacts with a correspondingly flat or complementarily arched safety wall section of the closing element. At the same time, shaped body and closing element are dimensioned such that in the locking position of the closing element the lid can lift slightly from the container under pressure building up in the pot interior. However, a ring seal still ensures sealing of the lid with respect to the container. In this manner, the closing element can be swivelled back again into its open position when the internal pressure in the pot has dropped. Therefore, this arrangement provides zero pressure safety, i.e. the closing element is prevented from being opened until the pressure within the pot is zero.

The sealing of the lid with respect to the container can be guaranteed preferably by means of a sealing lip of the ring seal that is disposed on the pot rim and that is forced to abut the container or the lid by the internal pressure of the pot. The closing mechanism of the invention can be operated even more easily, if, according to another feature of the invention, the bearing surface of the shaped body for the closing element is made of a material, in particular plastic, with a low coefficient of friction.

In the extreme case, a single closing element suffices, for example, when the side of the lid opposite the closing element is hinged to the container. It is expedient, however, to distribute several closing elements around the circumference of the container rim. So that all closing elements and shaped bodies can have the same shape, even if the outer contour of the container rim is round or oval, the closing elements are arranged preferably in a polygonal course in the region of the container rim, as viewed from above. In so doing, the closing elements can be spaced more or less far apart, where the length of the respective shaped bodies can be defined by the length of the closing elements. However, the shaped bodies also can extend beyond the closing elements and between the closing elements. It can also be provided in particular that the closing elements are mounted laterally in axial journals projecting into the closing elements and belonging to the shaped bodies arranged between the closing elements. The polygon course-like arrangement of the closing elements results especially when the closing elements are designed as pipe segments. In cooking pots with straight pot rim regions, the closing elements of the closing mechanism of the invention can extend directly parallel to respective portions of the container rim. It has been demonstrated that, in a cooking pot of conventional diameter and round outer contour with twelve closing elements arranged in a polygonal course, the closing elements reach approximately completely under the pot rim, each closing element absorbing only pro rate forces while the cooking pot is being used.

The opening and closing of the cooking pot according to the invention can be further simplified in that the closing elements can be operated synchronously by way of a common operating mechanism. In an especially simple embodiment of this inventive idea, the operating mechanism includes a flexible shaft which follows the container rim in order to operate the closing elements jointly. To swivel the closing elements, driving arms actuating the closing elements can be attached to the shaft.

An especially expedient and space-saving arrangement is obtained when the shaft can be rotated in the shaped bodies in the region of the swivel axis, preferably coaxially thereto. At the same time, each shaped body has therein a recess to accommodate the swivel movement of each driving arm. Owing to this specific design of the actuating mechanism, it is merely necessary to impart the closing and opening forces at one point to the flexible shaft or to one closing element, since the other closing elements are connected by way of the flexible shaft and are thus also swivelled.

The opening and closing operations can be easily effected by an operator, especially when the shaft or at least one of the closing elements can be operated by way of, e.g., an actuator including an actuating rod or lever from the center of the upper side of the lid, preferably the lid handle. A simultaneous turning and pushing is not necessary, as in the case of the aforementioned known cooking pot. When the actuator engages at least one driving arm attached to the shaft or at least one of the closing elements, the opening and closing process can be effected by a simple reciprocating movement of an actuating lever or by turning and pushing an operating knob, etc.

Another embodiment of the invention provides that an outwardly projecting hand actuating lever, with which the cooking pot can be closed and opened directly without any special amount of force, is attached to the shaft or at least one of the closing elements.

Within the scope of the invention, it is also possible that the actuating mechanism can be rendered inoperable to open the closing elements by means of a blocking element acting as a zero pressure safety as a function of the internal pressure of the pot, so that the cooking pot can be opened only after the pressure in the interior of the pot has dropped. Such blocking element can be designed as a blocking pin that can be moved back and forth under the internal pressure of the pot or its intrinsic eight and which in a blocking position prevents the actuators for the closing elements from moving into the open position.

According to another advantageous embodiment of the invention, the cooking pot includes actuators for the closing elements which are actuated by the internal pressure of the pot building up in the interior of the pot. In this manner, the closing elements close automatically when the internal pressure of the pot builds up, whereas they open when and only when the internal pressure of the pot has dropped to a specified degree. In this embodiment, it is not necessary to close and open the cooking pot manually. Rather, the closing and opening operations occur automatically. The operator has only to set the lid on the container or to remove it again following completion of cooking and a decrease in internal pressure. Further, the actuators may include transfer means to transfer the movement of an inner lid, that lifts under rising internal pressure of the pot and that falls under its own weight, to the closing elements or the shaft. In this embodiment, the internal pressure of the pot building up in the container is used to raise the inner lid, resulting in the inner lid in turn swivelling the closing elements into the locking position. Following completion of the cooking process and decrease in the internal pressure of the pot, the inner lid falls again due to its own weight and transfers by means of the transfer means this movement also to the closing elements, which automatically swing into their open positions.

A simple embodiment of this inventive idea provides that the transfer means includes at least one connecting element designed as a wire ring enclosing, e.g., the inner lid and engaging the inner lid and the shaft or at least engaging one of the closing elements. An especially simple and expedient mounting of the connecting element is achieved when it is firmly connected to the inner lid, e.g. fitted within a peripheral groove of the inner lid, and when it is fitted into and movable within an eye of the closing element.

In another especially simple embodiment of the automatic locking mechanism, the lid includes another separate annular section which forms the lid rim and on which the closing members are arranged and in which the inner lid can be moved back and forth. The inner lid is guided relative to the annular section by means of a sealing lip, which may or may not include passage openings. Frictional forces exerted on the inner lid by the sealing lip must be less than those forces with which the annular section is held by means of a seal at the container, for example by means of a sealing lip which abuts the inner wall of the container and which is part of an annular seal which is effective between lid and container. In this manner it is guaranteed that the inner lid is eventually raised relative to the annular section when the pressure builds up in the pot interior, whereas air located in the pot interior at the start of cooking can escape from the pot interior by way of the passage openings that are held open, so that the function of an aroma valve is fulfilled by the lid. Preferably, the inner lid of this embodiment of the inventive idea includes an outwardly bent sealing rim that extends under the annular section and which seals against the annular section, optionally with of an annular seal therebetween, only in the upper locking position of the inner lid, i.e. when the internal pressure of the pot has increased. In this manner, a good seal between the annular section and the inner lid is guaranteed, so that steam can escape during cooking, i.e. when a specific internal pressure of the pot is exceeded.

The sealing lip, with the aid of which the inner lid is guided relative to the annular section, preferably is part of the annular seal which also serves for the abutment of the sealing rim of the inner lid in the closing position. The annular seal can be mounted interchangeably on the inner rim of the annular section by being fitted or slipped thereon, a feature that is important for a wearable part of this type. The annular seal also preferably includes a sealing lip resting on the inner surface of the container wall and pressed thereagainst by the internal pressure of the pot, so that the tightness of the cooking pot is further increased with rising internal pressure of the pot.

To provide the lid of the cooking pot of the invention with an attractive appearance and to protect the closing elements and the shaped bodies from the ingress of dirt, the closing elements of another embodiment of the invention are overhung by a cover extending around the lid. Furthermore, such a cover may be hood-like and has the important advantage that when the pressure in the cooking pot is released by cold water, such water is deflected outwardly. The cover and the lid rim or the annular section forming the lid rim or a part thereof can form a modular unit that can be assembled and disassembled independently. Such unit can be detached in a simple manner for the purpose of cleaning the lid and can be attached again to the lid following cleaning. However, it is also possible that the lid can include an upper lid reaching over the closing elements and optionally the inner lid, so that the closing mechanism is virtually totally covered at the top outwardly, and the cooking pot therefore will not have an "industrial" appearance.

In an especially simple embodiment of the invention, the shaped bodies can be formed by a section of the rim of the upper lid itself, which in this case also can be made, for example, of plastic.

Especially when the closing elements and the inner lid are covered by an upper lid, it is advantageous if the inner lid interacts with an indicator pin which indicates the position of the inner lid relative to the annular section. In this manner it can be determined whether the cooking pot is in a closed or open state. The indicator pin can be movable preferably in a handle of the lid and form with such handle a structural unit. Within the scope of the invention it is also advantageous if a thermometer is centered in the lid handle provided in the upper lid and guided by an extension through the wall of the upper lid and optionally as far as the pot interior. In this manner it is possible to guide venting past the highest point of the lid and the thermometer, thus guaranteeing better heat transfer and reliable measurement of temperature. The extension can be displaced preferably in the wall of the inner lid.

Another feature of the invention provides that the underside of the handle of the lid includes a circumferential ring seal against which the wall of the inner lid abuts sealingly in its locked position. In this manner it can be guaranteed that the space between the handle of the lid and the inner lid is outwardly sealed in the locked position.

Preferably a guide bushing for the extension is disposed in the wall of the inner lid while maintaining the venting gap. The guide bushing includes an inner shoulder against which the extension rests sealingly in the locked position of the inner lid. In this manner it is guaranteed that up to the complete closure of the inner lid, air accumulating at the top under the inner lid can escape from the pot interior past the extension of the thermometer in order to vent almost completely the pot interior. On the other hand, however, the pot interior is also sealed hermetically in the region of the thermometer while the inner lid is completely raised.

For the same purpose, another alternative embodiment provides that while maintaining a venting gap the extension is guided through the wall of inner lid, and the handle of the lid bears on its underside an annular seal that envelops directly the extension and against which the wall of the inner lid abuts sealingly in its locked position. In another embodiment of the invention, for example, the handle of the cover, which can be rotated at the wall of the upper lid, can overhang a steam valve and include an actuating curved surface, by means of which, while rotating the handle of the lid, a closing body of the steam valve can be conveyed from a closed position into an open position. The handle of the lid preferably has in the region of the steam valve an exhaust opening which diverts the steam escaping through the steam valve to the side. Therefore, when actuating the steam valve by rotating the handle of the lid, the hand of the operator will not be burned by the escaping steam. The steam valve itself can be mounted, for example, in the wall of the inner lid and thus be protected.

BRIEF DESCRIPTION OF THE DRAWINGS

Other objects, features, advantages and possible applications of the present invention will be apparent from the following description of the embodiments thereof with reference to the accompanying drawings. At the same time all described and/or illustrated features form by themselves or in any arbitrary logical combination the subject matter of the present invention, independently of their summary in the claims.

FIG. 1a is shown in an open position and FIG. 1b in a blocking position of the closing elements.

FIG. 5 is a sectional view of an embodiment of the invention in which a closing mechanism can be actuated from a lid.

FIGS. 6a and b are views similar to FIGS. 1a and 1b but of an embodiment of the invention in which the closing mechanism is opened and closed automatically as a function of the internal pressure within a pot.

FIG. 6d is a vertical section of a complete cooking pot corresponding to the invention according to the embodiment shown in FIGS. 6a to 6c, but with a specially shaped lid handle.

DETAILED DESCRIPTION OF THE INVENTION

Figure 1A:
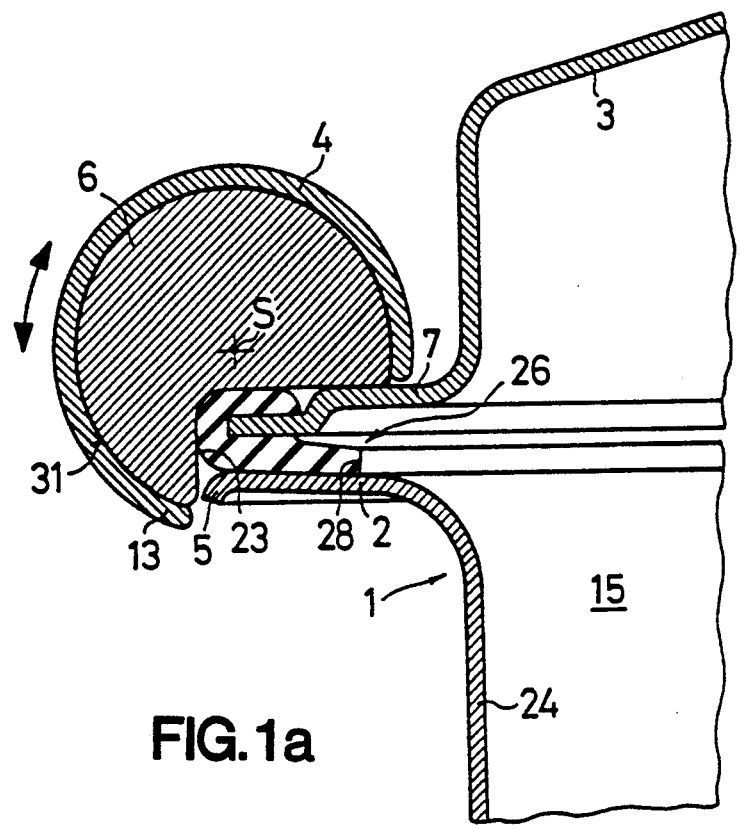
FIGS. 1a and b are sectional views of a schematic illustration of a closing mechanism according to one embodiment of the invention, shown in a plane perpendicular to swivel axes of closing elements, and in particular
Figure 1B:
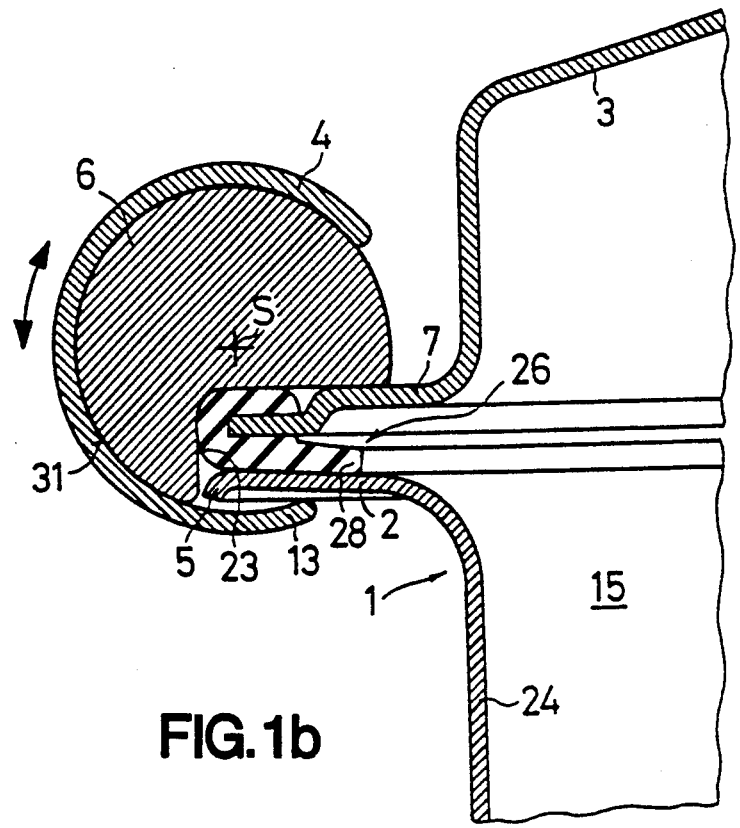

A cooking pot shown in partial section in FIGS. 1a and 1b includes a container 1 designed as a pot, bowl or pan which is, for example, open at the top, for the purpose of accommodating a product to be cooked, and has an outwardly and downwardly bent container rim 2. A lid 3 with a lid rim 7 can be set on the container rim 2. An annular seal 26, whose cross section is essentially U-shaped, is slipped on the lid rim 7. The region of the lid rim 7 on which fits seal 26 is bent downwardly in such a manner that an upper surface of the annular seal 26 aligns with an upper surface of a region of the lid rim 7 adjoining inwardly the downwardly bent region thereof. A bottom leg of the annular seal 26, which comes to rest between container rim 2 and lid rim 7, is elongated inwardly to form a sealing lip 28 which is pressed against the upper side of the container rim 2 under the pressure prevailing in interior 15 of the cooking pot.

The cooking pot is equipped with a closing mechanism, which includes a number of closing elements 4 distributed at uniform intervals around the circumference of the pot. The closing elements 4 are disposed in the region of the lid rim 7 and can be swiveled between an open position (FIG. 1a), releasing the lid 3 relative to the container 1, around a swivel axis S extending parallel to an outwardly facing outer edge 5 of container rim 2 or to the tangential of such outer edge 5 of the container rim 2, into a locking position (FIG. 1b), in which the closing element 4 reaches or is positioned under the container rim 2 for the purpose of licking the lid 3 pressure-tight relative to the container rim 2. In the illustrated case the swivel axis S lies somewhat above the lid rim 7 approximately in the region of an outer edge thereof. The position of the swivel axis S is defined by a shaped support body 6 made of plastic or another material having a low coefficient of friction and on which the respective closing element 4 can be swivelled. In this embodiment the closing element 4 is designed as a substantially tubular hollow body, one part of its circumference being cut away and having a circular-cylindrical wall that extends essentially parallel to the swivel axis S. One part of the circumferential wall of element 4 that borders on the cutout of the hollow body forms a locking wall section 13 which can be swivelled out of the open position, which is shown in FIG. 1a and whereat the edge of such locking wall section 13 lies outside the circumference of the container rim 2, into a locking position according to FIG. 1b, whereat the outer edge of the locking wall section 13 rests on the underside of the container rim 2.

The shaped body 6 is provided with a recess 23 which is disposed and dimensioned in such a manner that a surface of the shaped body 6 that defines the top of the recess 23 rests on the upper leg of the annular seal 26 and the inwardly adjoining part of the lid rim 7, whereas a surface of body 6 defining the outside of the recess 23 rests on the outside of the annular seal 26. The recess 23 is open downwardly. The width and height of the recess 23 are dimensioned in such a manner that, when the lid 3 is set on the container 1, the lid rim 7 and the container rim 2, including the annular seal 26, can be accommodated by recess 23 and the locking wall section 13 can be swivelled under the container rim 2 without interference. The shaped bodies 6 with the closing elements 4 mounted thereon are attached to the lid rim 7 in a manner that is not shown in detail. As seen from the top, the closing elements 4 have the shape of pipe segments. The closing elements 4 and the shaped bodies 6 comprise straight, identical pieces and thus form a polygonal course when the lid 3 or lid rim 7 whose circumference is round is viewed from above.

It is evident from FIGS. 1a and 1b that it can be determined, through choice of the position of the swivel axis S and of the diameter of the closing element 4, where the locking wall section 13 engages on the underside of the container rim 2. It can also be determined, for example, that such engagement is as close as possible to container wall 24, so that the container rim 2 is not deformed even at high compression stresses. It is also evident that, due to the arrangement of the swivel axis S and the design of the closing element 4 as a hollow body, a bend of the container rim 2 at the outer rim edge 5 is enveloped toward the bottom.

Figure 2A:
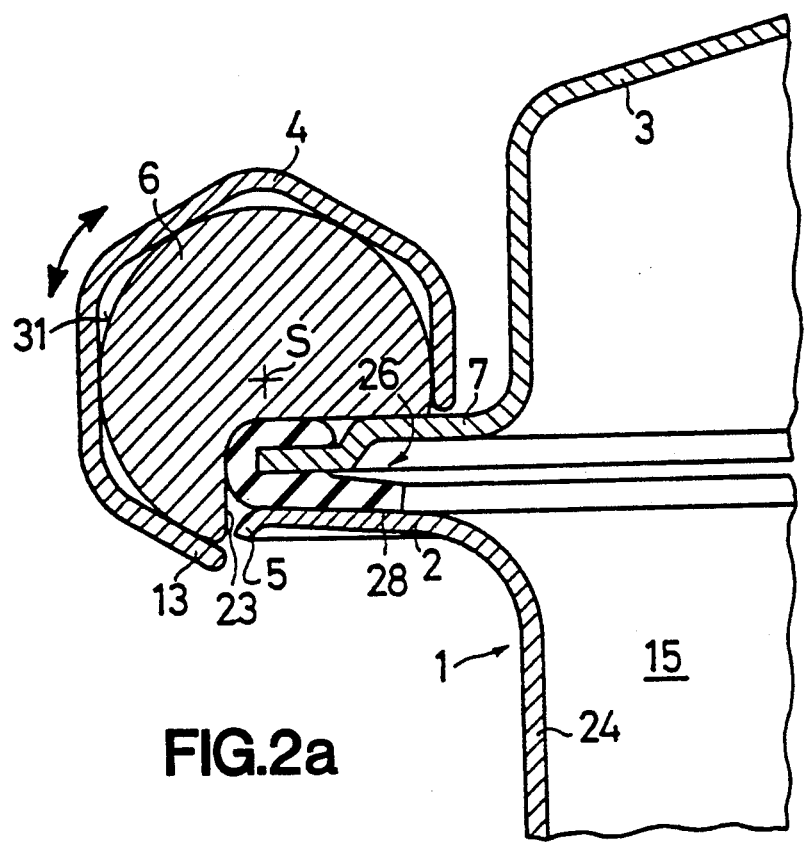
FIGS. 2a and b are views corresponding to FIGS. 1a and 1b but of another embodiment of the invention.
Figure 2B:
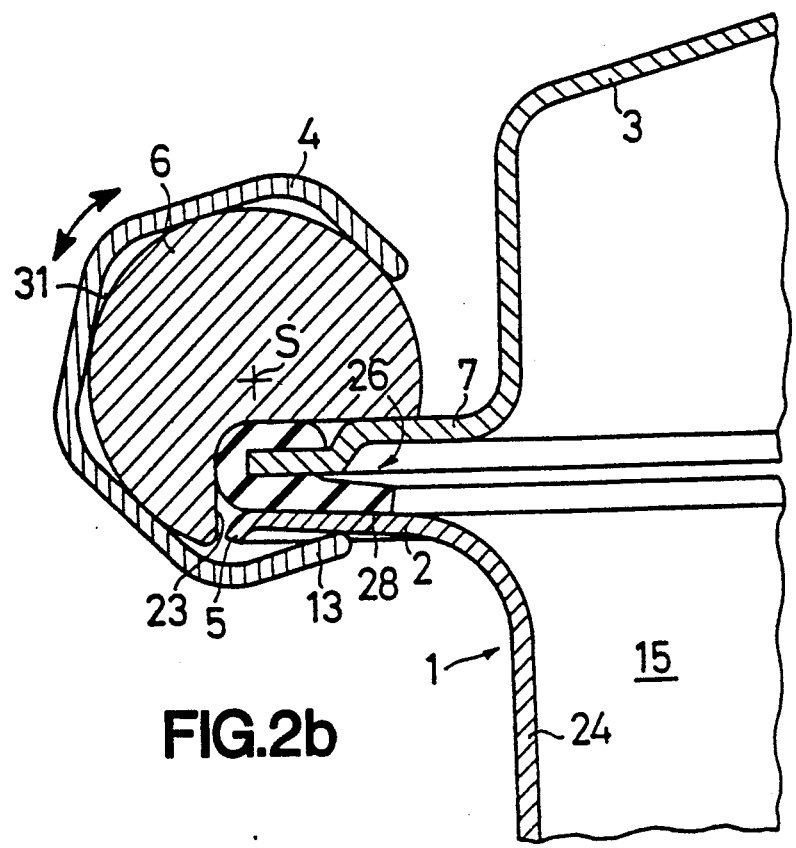

The embodiment of the invention that is shown in FIGS. 2a and 2b differs from that shown in FIGS. 1a and 1b only in the fact that the cross section of the closing elements 4 is not circular-cylindrical but rather is polygonal. Thus, the closing elements 4 have prismatic walls that extend substantially parallel to the swivel axis S. Here also, the wall is recessed over a portion of its circumference, so that the locking wall section 13 can be conveyed by swivelling of element 4 from the open position shown in FIG. 2a into the locking position shown in FIG. 2b. Outer bearing surface 31 of the shaped body 6 is also circular-cylindrical and contacts the individual wall sections of the closing elements 4.

Figure 3A:
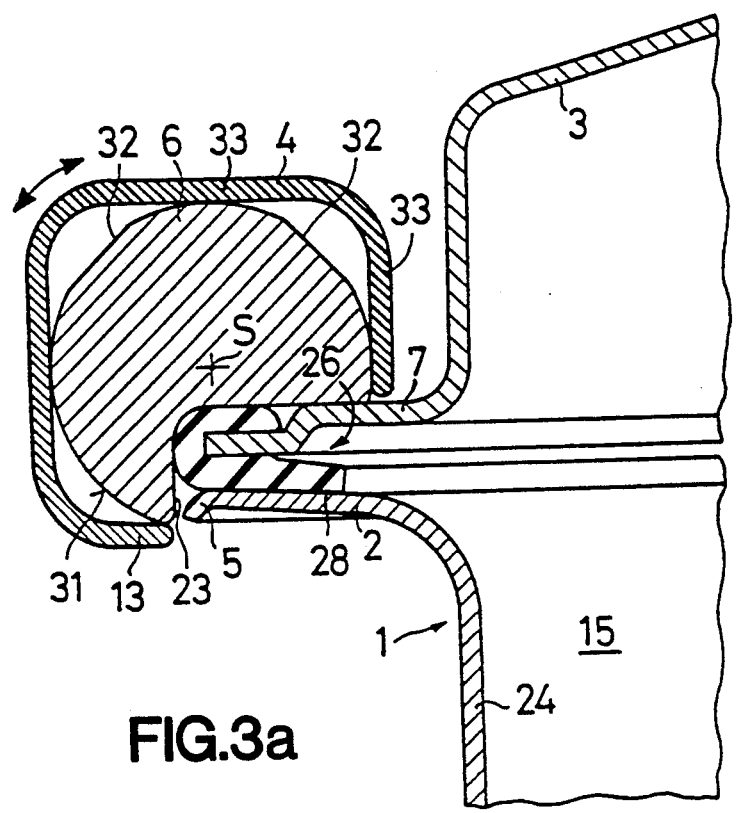
FIGS. 3a and b are views corresponding to FIGS. 1a and 1b but of still another embodiment of the invention.
Figure 3B:
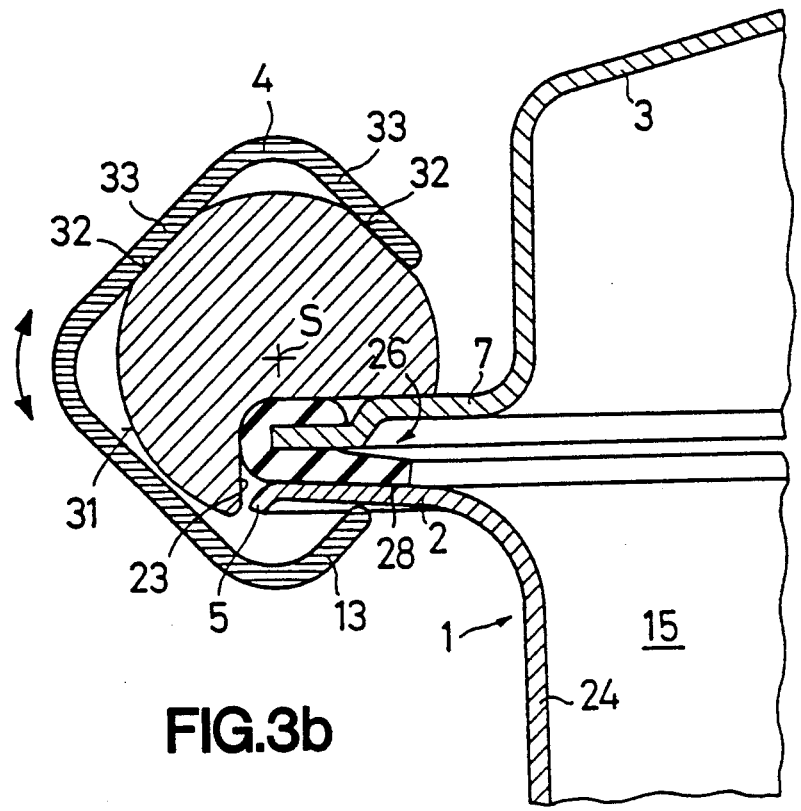

Even in the case of the embodiment of the invention shown in FIGS. 3a and 3b, the closing elements 4 have a prismatic shape, in the illustrated case a shape whose cross section essentially is square. The bearing surface 31 of the shaped body 6 is not totally circular-cylindrical but rather has two planar surface portions 32, each extending at an angle of 45° to the horizontal and spaced about axis S by 90°. The consequence is that the longitudinal axis of the closing element 4 is located somewhat higher in the open position shown in FIG. 3a than in the locking position shown in FIG. 3b. This is due to the fact that two adjacent upper safety wall sections 33 of the closing element 4 in the locking position do not abut the circular-cylindrical part of the bearing surface 31, but rather abut the planar surfaces 32 that are spaced from the swivel axis S by a shorter distance than is surface 31. This means, as is evident from FIG. 3b, that the container rim 2 and the lid rim 7 can be spaced further apart when pressure is building up in the pot interior 15 than in the starting position according to FIG. 3a. The tightness of the cooking pot is guaranteed, however, in that the higher the pressure within the pot, the harder the sealing lip 28 of the annular seal 26 is pressed by the rising pressure within the pot against the upper side of the container rim 2. It can also be recognized from the geometric relationships shown in FIG. 3b that under such an internal pot pressure the closing elements 4 can no longer be swivelled into their open position from the position of FIG. 3b. This would be possible only if the internal pot pressure were overcome, i.e. by slightly compressing container 1 and lid 3. Thus, the embodiment according to FIGS. 3a and 3b provides a zero pressure safety.

Figure 4A:
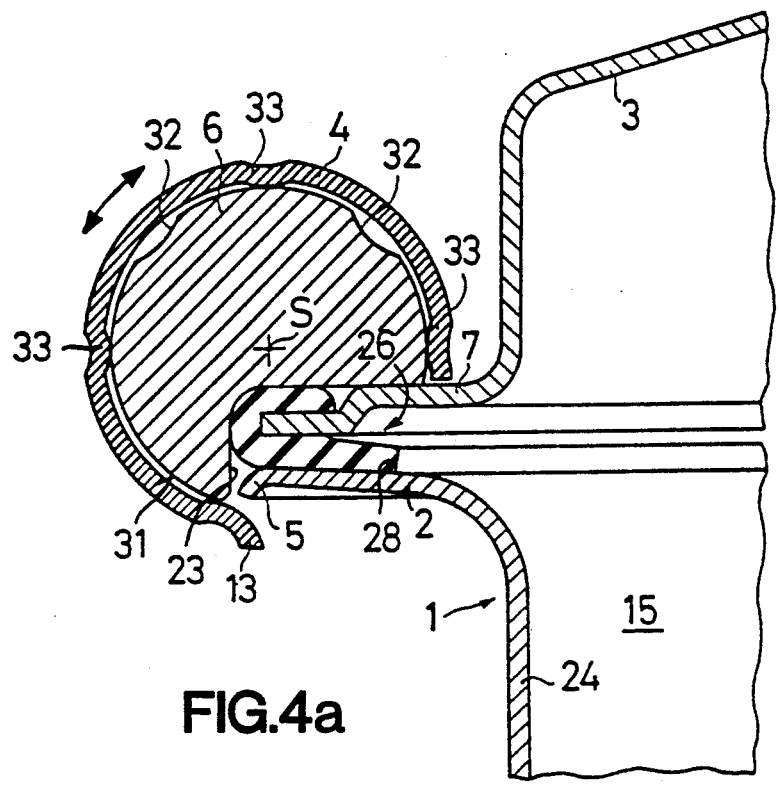
FIGS. 4a and b are views corresponding to FIGS. 1a and 1b but of a fourth embodiment of the invention.
Figure 4B:
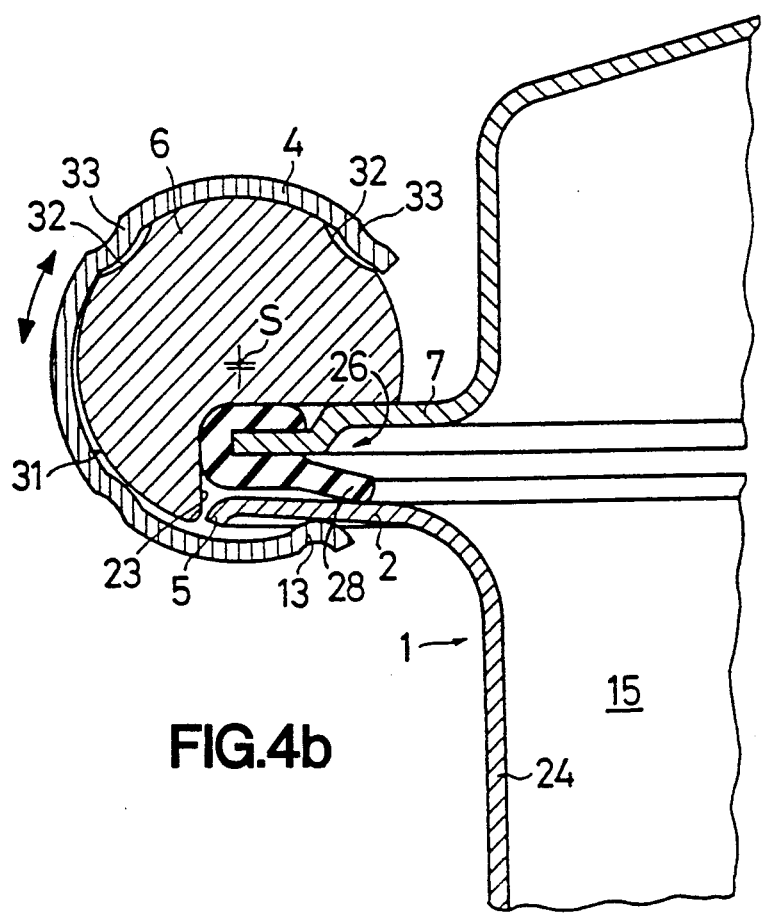

The embodiment of the invention according to FIGS. 4a and 4b is similar to those discussed above. The closing elements 4 essentially are circular-cylindrical. However, they have inwardly curved safety wall sections 33, which are offset by 90° and which extend 45° to the horizontal when in the locking position shown in FIG. 4b and thereat fit and lock into suitably arranged niches 32 in the shaped body 6. Thus, a zero pressure safety also is obtained in the manner explained above.

According to the embodiment of the invention shown in FIG. 5, the closing elements 4 can be actuated synchronously by way of a joint actuating mechanism. The actuating mechanism includes a flexible shaft 8 following or extending parallel to the pot rim. The shaft 8 is received in the shaped bodies 6 in such a manner that the axis of rotation of shaft 8 coincides with the swivel axis S of the closing elements 4. The shaft 8 has thereon, at intervals corresponding to the closing elements 4, substantially radial driving arms 9 in order to actuate the individual closing elements 4. The driving arms 9 extend into openings 29 in the closing elements 4. Each shaped body 6 is provided with a slotted recess 10 for the purpose of enabling swivelling the driving arms 9. On the shaft 8, or on at least one closing element 4, is attached a rocking lever 12 which engages with actuators 11, shown in the illustrated embodiment as an actuating rod. The actuating rod is guided to the center of the lid 3, for example to a center handle of the lid, from where the rod can be moved back and forth by an operator in the direction indicated by the arrow, such that all of the closing elements 4 can be swivelled jointly into the illustrated open position or into the locking position shown by dash-dotted lines.

The closing elements 4 are overhung by a cover 36 extending around the lid 3. A pin-shaped blocking element 35 can be moved up and down in the wall of lid 3 under the internal pressure of the pot or by its own weight. In a bottom releasing position of element 35 shown in FIG. 5 the movement of the actuators 11 is not impeded. Upon build up of pressure in the pot interior 15, the blocking element 35 rises until a sealing ring 54 abuts sealingly on the face of a guide bushing 55 arranged in the wall of the lid 3. In this blocking position the blocking element 35 impedes, as indicated by the dashed lines, the movement of the actuators 11. Thus, opening of the closing mechanism is impeded by the internal pressure prevailing in the cooking pot.

In the embodiment shown in FIG. 5, the lid rim 7 is designed as a ring element independent of the lid body. It can be designed together with the shaped bodies 6 and attached thereto, with the closing elements 4, including the flexible shaft 8, the driving arms 9 and the rocking lever 12, as well as the cover 36, mounted thereon as a modular unit that can be assembled and disassembled independently. The body of the lid 3 has an outwardly bent rim flange 56, on which is slipped an annular seal 22 having an F-shaped cross section. An upper leg of the annular seal 22 lies between the rim flange 56 and the lid rim 7. A downwardly extending leg of the annular seal 22 defines a sealing lip which is pressed against the container wall 24 by the internal pot pressure.

Figure 6C:
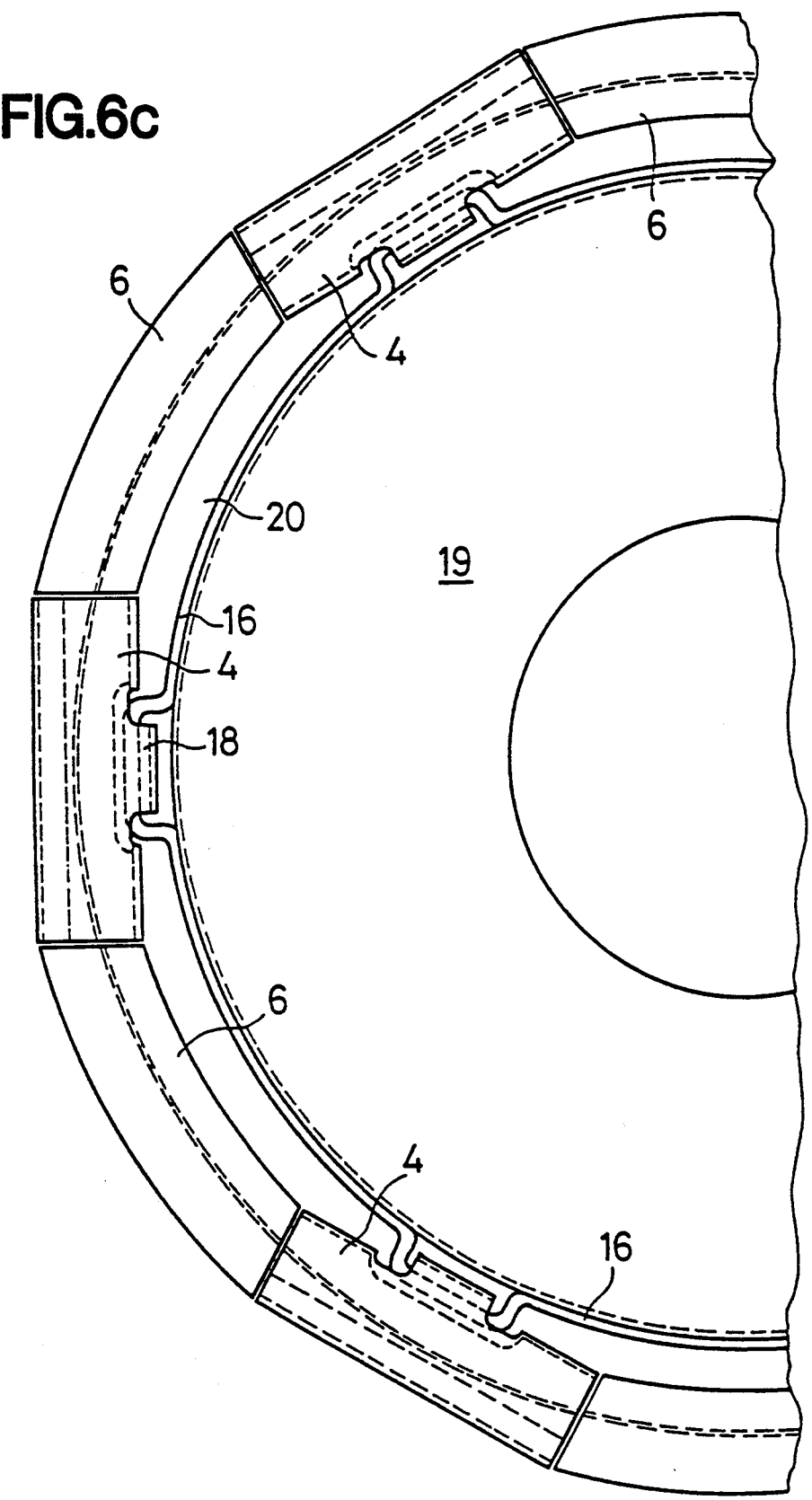
FIG. 6c is a top view of a cooking pot of the invention corresponding to the embodiment of FIGS. 6a and 6b, shown partially cut away and with an upper lid removed.

In the embodiment of the invention that is shown in FIGS. 6a to 6c, the lid 3 is divided into an annular section 20 forming the lid rim 7 and an inner lid 19 that rises under the internal pressure of the pot and that falls under its own weight. The closing elements 4 are disposed on the lid rim 7 by means of the shaped bodies 6. To mount the shaped bodies 6, a slot 57 in each body 6 receives an upwardly bent rim section 58 of the lid rim 7. The inner lid 19 is guided relative to annular section 20 by means of a sealing lip 37 which is provided at intervals with passage openings 38. The sealing lip 37 forms a part of the annular seal 22 and in the closing position also is abutted by a sealing rim 21 of the inner lid 19, the sealing rim 21 being bent outwardly. Frictional forces effective between the sealing lip 37 and the outer surface of the inner lid 19 are less than frictional forces with which the annular section 20 is held at the container 1 by a sealing lip 25 of the annular seal 22. For this reason, the inner lid 19 can lift relative to the annular section 20 when the internal pot pressure rises. The passage openings 38 are dimensioned to be sufficiently small to ensure that, while air to be displaced from the pot interior 15 when the pressure rises can escape, adequate pressure builds up to raises the inner lid 19 until it occupies its locking position shown in FIG. 6b and whereat sealing rim 21 rests on the sealing lip 37. In this embodiment, the annular seal 22 fits on an outwardly bent rim section 59 of the annular section 20.

In this embodiment, actuators 14 are provided for the closing elements 4 and are actuated by the internal pot pressure that builds up in the pot interior 15. The back and forth movement of the inner lid 19 is transferred from transfer means 16 to at least one of the closing elements 4 or the shaft 8. The transfer means 16 is a connecting element in the form of a wire ring engaged with the inner lid 19 and with the shaft 8 or at least at one of the closing elements 4. Transfer means 16 envelops the inner lid 19, as is evident from FIG. 6c, and is connected permanently thereto by fitting into a circumferential groove 17 of the inner lid 19. Transfer means 16 fits into and is movable within an eye 18 of the closing element 4. As is evident from a comparison of FIGS. 6a and 6b, the inner lid 9 causes movement of the closing elements 4 when the pressure rises and swivels them from the open position in the locking position. When the internal pot pressure drops, the closing elements swing back automatically from the locking position into the open position so that the lid 3 can be removed form the container 1 in a simple manner.

In the embodiment of the invention shown in FIGS. 6a and 6b, the inner lid 19 and the annular section 20 with the closing mechanism, including the closing elements 4, are covered by an upper lid 34 connected to the inner lid 19. This is evident in particular from FIG. 6d. In the embodiment of the invention shown there, a lid handle 40 can be rotated in a centered recess 60 of the upper lid 34. An indicator pin 39 is disposed in such a manner in one section of the lid handle 40 that, when the inner lid 19 is conveyed into an upper closing position from a lower rest position, pin 39 is displaced axially into an upper indicating position. Therefore, the position of the inner lid 19 relative to the annular section 20 on the container rim 2 can be read by the position of the indicator pin 39, and thus it can be determined whether the cooking pot is or is not still under pressure. A thermometer 41, which is fixed in the wall of the upper lid 34 with a bottom sleeve-like extension 44 made of metal or another material that can conduct heat well, is mounted in a central depression 42 of the lid handle 40. The central region of the bottom of the depression 42 is formed by an upper flange section 43 of the extension 44. A bottom end of extension 44 projects into a guide bushing 50 received in a central recess of the wall of the inner lid 19, while maintaining a venting gap 53. Since the extension 44 is designed like a sleeve, the inside of the extension 44 is flow connected to the pot interior 15, thus resulting in optimal heat transfer. Good heat transfer is also guaranteed by the fact that the air that rises when the cooking pot is heated can flow to the outside through the annular gap 53 past the extension 44, until the inner lid 19 moves into its upper locking position and a bottom face of the extension 44 becomes abutted by a sealing ring 61 which is accommodated on an inner shoulder 51 of the guide bushing 50. Thus, air or steam is prevented from escaping as soon as the sealing rim 21 comes to rest on the sealing lip 37. The lid handle 40 has on a downwardly facing annular section 62 thereof a circumferential annular seal 49 which in the locking position of the inner lid 19 rests sealingly on the upper side of lid 19. A steam valve 45 is mounted in the wall of the inner lid 19 within the circumferential annular seal 49. The rotatable lid handle 40 has an actuating curved member 46 which, when the lid handle 40 is rotated, moves a locking body 47 of the steam valve 45 from a closed position into an open position. Steam escaping from the steam valve 45 can pass through a side exhaust opening 48 laterally so that the hand of an operator grasping the lid handle 40 will not be contacted by the steam.

Figure 7:
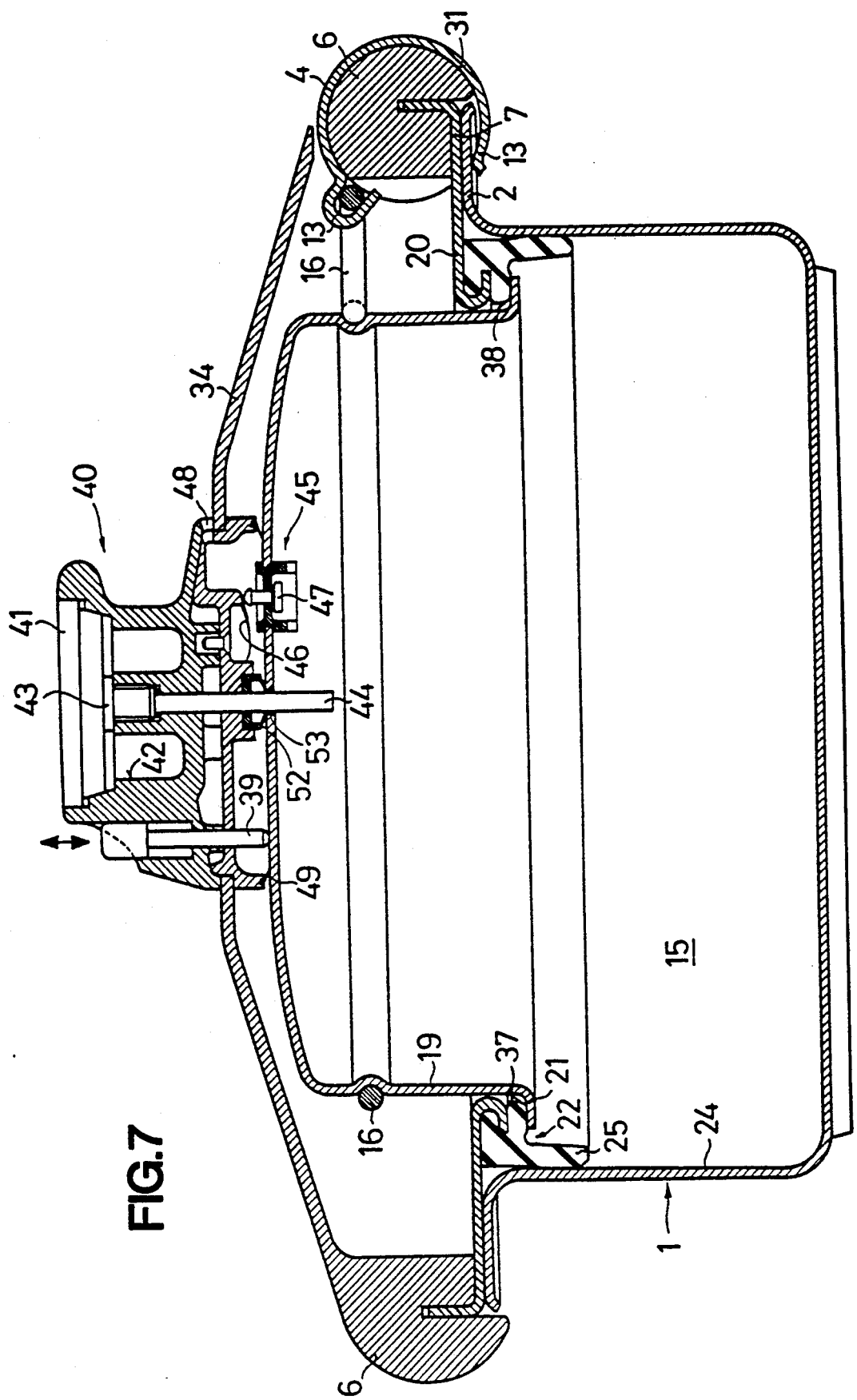
FIG. 7 is a view corresponding to FIG. 6d, but of still another embodiment of the invention.

In the embodiment of the invention shown in FIG. 7, the outer rim of the upper lid 34 itself forms the shaped bodies 6. The upper lid 34 including the shaped bodies 6 can be made of plastic. Furthermore, the embodiment of the invention according to FIG. 7 differs from that shown in FIG. 6c in the region of passage of the thermometer from the lid handle 40 into the pot interior 15. While holding open a venting gap 53, the extension 44 projects through the wall of the inner lid 19. The bottom side of the lid handle 40 has an annular seal 52 which directly envelops the extension 44, so that in the upper closed position of the inner lid 19 the venting gap 53 is sealed by the annular seal 52. Even in this embodiment, the temperature is measured reliably because the extension 44 projects into the pot interior 15 and upon heating the rising air flows past the extension 44 and because the venting gap 53 is centered and thus virtually all of the rising air can be expelled up to the discharge of steam.

I claim

1. In a cooking pot including a container having a wall and an outwardly extending peripheral container rim having an outwardly facing outer edge, a lid for closing said container and having an outwardly extending lid rim to be positioned over said container rim, and a closing mechanism for locking said lid on said container in a pressure tight manner, said closing mechanism including at least one closing element mounted on said lid for swivelling movement about a swivel axis, extending substantially parallel to said outer edge of said container rim or to a tangent to said outer edge when said lid rim is positioned over said container rim, between an open position, whereat said lid is released relative to said container, and a locking position, whereat said closing element extends beneath said container lid and locks said lid to said container, the improvement comprising:

a support body mounted on said lid;

said closing element comprising a hollow body defined by a peripheral wall that is interrupted circumferentially to define a circumferential end edge;

said hollow body being mounted on said support body and being supported thereby for said swivelling movement relative thereto between said open and locking positions and with said peripheral wall extending substantially parallel to said swivel axis; and said circumferential end edge extending beneath said container rim when said hollow body is in said locking position and being spaced from said container rim when said body is in said open position.

2. The improvement claimed in claim 1, wherein said peripheral wall is of substantially cylindrical configuration with a circular cross section transverse to said swivel axis.

3. The improvement claimed in claim 1, wherein said peripheral wall is of substantially prismatic configuration with a polygonal cross section transverse to said swivel axis.

4. The improvement claimed in claim 1, wherein said support body is mounted on said lid rim.

5. The improvement claimed in claim 1, wherein said support body has therein a sector-shaped recess accommodating said lid rim and said container rim.

6. The improvement claimed in claim 1, wherein said support body has an outer bearing surface guiding said swivelling movement of said hollow body.

7. The improvement claimed in claim 6, wherein said outer bearing surface is cylindrical.

8. The improvement claimed in claim 1, wherein said support body and said hollow body have cooperating elements interacting to retain said hollow body in said locking position.

9. The improvement claimed in claim 8, wherein said interacting elements comprise flattened surface portions on said peripheral wall of said hollow body and on an outer surface of said support body.

10. The improvement claimed in claim 8, wherein said interacting elements comprise a recess in an outer surface of said support body and a projection extending inwardly from said peripheral wall of said hollow body.

11. The improvement claimed in claim 1, further comprising an annular seal sealing said lid rim to said container rim and including a sealing up urged against said container by pressure internally of said pot.

12. The improvement claimed in claim 11, wherein said annular seal is U-shaped in cross section and includes first and second legs, said lid rim is positioned between said first and second legs, and said second leg defines said sealing lip and is pressed by the internal pot pressure against said container rim.

13. The improvement claimed in claim 11, wherein said annular seal is F-shaped in cross section and includes spaced legs between which fits said lid rim and a downwardly extending flange that defines said sealing lip and that is pressed by the internal pot pressure against an internal wall surface of said container.

14. The improvement claimed in claim 1, wherein an outer bearing surface of said support body is formed of a material having a low coefficient of friction.

15. The improvement claimed in claim 1, comprising a plurality of said closing elements arranged in a polygonal pattern as viewed from above.

16. The improvement claimed in claim 15, further comprising an actuating mechanism for operating synchronously said plurality of closing elements.

17. The improvement claimed in claim 16, wherein said actuating mechanism includes a flexible shaft extending around said lid and having members for swivelling said hollow bodies.

18. The improvement claimed in claim 17, wherein said members comprise driving arms attached to and extending from said shaft.

19. The improvement claimed in claim 18, wherein said shaft is mounted for rotation within respective said support bodies of said plurality of closing elements, and said support bodies have therein respective recesses receiving and enabling swivelling movement of respective said driving arms.

20. The improvement claimed in claim 19, wherein said shaft extends coaxially of said swivel axis.

21. The improvement claimed in claim 17, further comprising an actuator mounted on said lid for operating said shaft at one of said hollow bodies.

22. The improvement claimed in claim 21, wherein said actuator comprises a rod extending from the center of said lid.

23. The improvement claimed in claim 21, further comprising a rocking lever engaged by said actuator and attached to said shaft or to said one hollow body.

24. The improvement claimed in claim 21, wherein said actuator comprises an outwardly directed, manually operable lever attached to said shaft or to said one hollow body.

25. The improvement claimed in claim 21, further comprising a blocking element mounted to maintain said actuator in a position to block movement of said hollow bodies from said locking positions thereof to said open positions thereof.

26. The improvement claimed in claim 15, wherein said blocking element extends slidably through said lid, and is operable to be movable outwardly thereof by internal pressure within said pot to block movement of said actuator and movable inwardly thereof by gravity upon reduction of internal pressure to unblock said actuator.

27. The improvement claimed in claim 16, wherein said actuating mechanism is operable in response to build up of internal pressure within said pot to move said hollow bodies to said locking positions thereof.

28. The improvement claimed in claim 27, wherein said lid is movable upwardly relative to said container by said pressure build up and is movable downwardly by gravity relative to said container, and said actuating mechanism is connected between said lid and said closing elements.

29. The improvement claimed in claim 28, wherein said actuating mechanism comprises a ring connected to said lid and movable therewith, and connecting elements extending from said ring and movably connected to said closing elements.

30. The improvement claimed in claim 29, wherein said ring fits within a circumferential groove formed in said lid.

31. The improvement claimed in claim 27, wherein said lid comprises an external annular section defining said lid rim and on which are mounted said closing elements, and an inner lid mounted within said annular section for upward and downward movement relative thereto.

32. The improvement claimed in claim 31, further comprising an annular sealing lip guiding movement of said inner lid relative to said annular section.

33. The improvement claimed in claim 32, wherein said sealing lip has therethrough vent openings.

34. The improvement claimed in claim 32, wherein said inner lid has an annular outwardly extending sealing rim to be brought into sealing relationship with said annular section upon said inner lid being moved upwardly relative thereto by build up of the internal pressure to a position such that said actuating mechanism moves said hollow bodies to said locking positions thereof.

35. The improvement claimed in claim 34, further comprising an annular seal between said sealing rim and said annular section.

36. The improvement claimed in claim 35, wherein said sealing lip is part of said annular seal.

37. The improvement claimed in claim 36, wherein said annular seal is fitted on an inner rim of said annular section.

38. The improvement claimed in claim 36, wherein said annular seal includes a downwardly extending sealing flange urged against an internal wall surface of said container by the internal pressure.

39. The improvement claimed in claim 1, further comprising a cover positioned above plural said closing elements and extending around said lid.

40. The improvement claimed in claim 39, wherein said cover and at least said lid rim comprise a modular unit.

41. The improvement claimed in claim 1, wherein said lid comprises an upper lid extending above plural said closing elements and an inner lid positioned below said upper lid and vertically movable relative thereto.

42. The improvement claimed in claim 41, wherein support bodies of respective said closing elements are formed integrally with a rim of said upper lid.

43. The improvement claimed in claim 41, further comprising an indicator pin positioned to interact with said inner lid to indicate a position of said inner lid relative to said upper lid.

44. The improvement claimed in claim 43, wherein said indicator pin is mounted for relative movement axially in a handle of said lid.

45. The improvement claimed in claim 44, wherein said handle is mounted on said upper lid, and further comprising a thermometer mounted in said handle and having an extension extending downwardly through said upper lid.

46. The improvement claimed in claim 45, wherein said extension extends downwardly through said inner lid to the interior of said pot.

47. The improvement claimed in claim 46, wherein said extension is displaceable relative to said inner lid.

48. The improvement claimed in claim 46, wherein an underside of said handle has thereon an annular seal surrounding said extension and sealing on said inner lid in a relatively upper position thereof.

49. The improvement claimed in claim 47, further comprising a guide brushing mounted in said inner lid, said extension extending through said bushing and being guided thereby during movement relative thereto, said bushing defining a vent gap through said inner lid, and said bushing having an inner shoulder sealingly abutting said extension at an uppermost position of said inner lid relative to said upper lid.

50. The improvement claimed in claim 45, wherein said handle is rotatably mounted in said upper lid and has a curved surface, and further comprising a steam valve mounted in said lid at a position to be opened by being contacted by said curved surface upon rotation of said handle.

51. The improvement claimed in claim 50, wherein said steam valve is mounted in a wall of said inner lid.

52. The improvement claimed in claim 50, wherein said handle has therethrough an exhaust opening located at a position to divert laterally any steam exhausted through said steam valve.

* * * * *